(12) United States Patent
Bhattacharya

(10) Patent No.: US 11,031,757 B2
(45) Date of Patent: Jun. 8, 2021

(54) SUBMARINE CABLE ROUTE PLANNING TOOL

(71) Applicant: Google LLC, Mountain View, CA (US)

(72) Inventor: Shirshendu Bhattacharya, Zürich (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/674,314

(22) Filed: Nov. 5, 2019

(65) Prior Publication Data

US 2021/0091546 A1    Mar. 25, 2021

Related U.S. Application Data

(60) Provisional application No. 62/903,230, filed on Sep. 20, 2019.

(51) Int. Cl.
| | |
|---|---|
| *H02G 1/10* | (2006.01) |
| *G01C 21/00* | (2006.01) |
| *G01C 21/20* | (2006.01) |
| *B63B 35/04* | (2006.01) |

(52) U.S. Cl.
CPC .............. *H02G 1/10* (2013.01); *B63B 35/04* (2013.01); *G01C 21/005* (2013.01); *G01C 21/20* (2013.01)

(58) Field of Classification Search
CPC ........ H02G 1/10; H02G 2200/20; H02G 9/02; B63B 35/03; B63B 35/04; G01C 21/005; G01C 21/20
See application file for complete search history.

(56) References Cited

U.S. PATENT DOCUMENTS

| | | | |
|---|---|---|---|
| 7,164,883 B2* | 1/2007 | Rappaport | G06Q 10/10 455/3.01 |
| 8,668,406 B2 | 3/2014 | Vidal et al. | |
| 9,891,333 B2* | 2/2018 | Valsvik | G01V 1/3852 |
| 10,425,280 B2* | 9/2019 | Zukerman | H04L 41/0826 |
| 2019/0116090 A1 | 4/2019 | Zukerman et al. | |
| 2019/0369290 A1* | 12/2019 | Zukerman | G06Q 10/067 |
| 2020/0083679 A1* | 3/2020 | Zukerman | G06Q 50/08 |

OTHER PUBLICATIONS

Makai Ocean Engineering, Inc., MakaiPlan Cable Route Engineering Software, (Year: 2016).*

(Continued)

*Primary Examiner* — Carib A Oquendo
(74) *Attorney, Agent, or Firm* — Lerner, David, Littenberg, Krumholz & Mentlik, LLP

(57) ABSTRACT

An underwater cable route planning technology is provided for automatically generating underwater cable routes using a model. In this regard, one or more processors may receive bathymetry data, and may also receive existing route data for a plurality of existing underwater cable routes. Based on the bathymetry data and the existing route data, a model for determining underwater cable routes may be generated. As such, when a request for an underwater cable route connecting a first location and a second location is received, the model may be used to generate one or more potential underwater cable routes based on the first location, the second location, and the bathymetry data.

20 Claims, 6 Drawing Sheets

(56) References Cited

OTHER PUBLICATIONS

"MakaiLay." Submarine Cable Management Software. Published in 2008. Makai Ocean Engineering, Inc. Kailua, Hawaii. <www.makai.com>. 16 pages.

"Software-Driven Auto-Position Tool for Submarine Cable Route Planning." Apr. 1, 2019. Makai Ocean Engineering. Ocean News & Technology. Retrieved from the Internet: <https://www.oceannews.com/news/science-technology/software-driven-auto-position-tool-for-submarine-cable-route-planning>. 6 pages.

Andres, Jose M. et al. "Cable Route Planning and Installation Control: Recent Advances." Published in 2007. Makai Ocean Engineering, Inc., Waimanalo, Hawaii, USA. pp. 1-5.

Evans, Graham. "Overview of Submarine Cable Route Planning & Cable Route Survey Activities." Published in 2009. EGS Survey Group. <www.egssurvey.com>. 37 pages.

Lavallée, Brian. "The future of submarine networks. What's Next?" Jun. 13, 2019. Ciena. Retrieved from the Internet: <https://www.ciena.com/insights/articles/The-future-of-submarine-networks-Whats-NEXT.html>. 14 pages.

Millar, David. "Technological Innovations for Integrating Subsea Systems Planning, Installations, and Maintenance." Racal Pelagos, Inc. San Diego, CA USA. pp. 1-16.

Mayer et al. Decision-Making Methodology for Design of Subsea Line Structures. Mastering the Oceans through Technology. Newport, Rhode Island. Oct. 26-29, 1992; Proceedings of the Oceans Conference. New York, IEEE, US, vol. 1, Oct. 26, 1992 (Oct. 26, 1992), pp. 180-185.

Evans. Overview of Submarine Cable Route Planning & Cable Route Survey Activities. Oct. 1, 2009 (Oct. 1, 2009), pp. 1-37, Retrieved [on Jan. 19, 2021] from the Internet: <https://cil.nus.edu.sg/wp-content/uploads/2009/10/CIL-Survey-Background-Presentation-Graham-Evans.pdf>.

Extended European Search Report for European Patent Application No. 20196668.6 dated Feb. 2, 2021. 17 pages.

* cited by examiner

SUBMARINE CABLE ROUTE PLANNING TOOL

CROSS-REFERENCE TO RELATED APPLICATIONS

This application claims the benefit of the filing date of U.S. Provisional Patent Application No. 62/903,230 filed Sep. 20, 2019, the disclosure of which is hereby incorporated herein by reference.

BACKGROUND

To carry telecommunication signals across bodies of water, such as oceans, rivers, lakes, cables may be laid underwater, for example on ocean floors. A multitude of factors need to be considered when planning underwater cable routes. For example, the factors may include physical constraints, territorial constraints, regulations, etc. As such, planning underwater cable routes requires a considerable amount of time and human effort. Failing to consider all the factors may result in inefficient use of natural and human resources, environmental damage, interference with oil pipelines, etc. Even with careful planning, it may later be discovered that existing underwater cable routes have certain portions that are prone to faults that cause outages. Repairing the faults may also require a considerable amount of time, resources, and effort.

SUMMARY

The present disclosure provides for receiving, by one or more processors, bathymetry data; receiving, by the one or more processors, existing route data for a plurality of existing underwater cable routes; and generating, based on the bathymetry data and the existing route data, a model for determining underwater cable routes.

The method may further comprise generating, by the one or more processors based on the received bathymetry data, speed data for laying cables along the plurality of existing underwater cable routes, wherein the model may be generated further based on the speed data.

The method may further comprise generating, by the one or more processors based on the received bathymetry data, cable type data along the plurality of existing underwater cable routes, wherein the model may be generated further based on the cable type data.

The method may further comprise receiving, by the one or more processors, predetermined best practice rules for laying underwater cable routes, wherein generating the model may be further based on the predetermined best practice rules. The predetermined best practice rules may include at least one of: rules for pipeline crossing, rules for handling cable slack in mountainous regions underwater, rules for cable type based on depth of water.

The method may further comprise generating, by the one or more processors based on ship traffic along the plurality of existing underwater cable routes, outage data for the plurality of existing underwater cable routes, wherein generating the model may be further based on the outage data. The method may further comprise tracking, by the one or more processors, locations of ships over time along the plurality of existing underwater cable routes; determining, by the one or more processors based on the locations of the ships, that one or more ships remain at one or more particular locations along the plurality of existing underwater cable routes for a predetermined length of time; and determining, by the one or more processors based on the ships remaining at the particular locations for the predetermined length of time, that outages have occurred at the particular locations.

The method may further comprise receiving, by the one or more processors, cost information for the plurality of existing underwater cable routes, wherein the model may be generated further based the cost information. The cost information may include at least one of: cable cost, ship cost, territorial cost.

The method may further comprise generating, by the one or more processors, a grid representing a surface of the Earth; mapping, by the one or more processors, the received bathymetry data on the grid; mapping, by the one or more processors, the received existing route data on the grid; wherein the model may be generated by using the mapped bathymetry data and the mapped existing route data as training input.

The method may further comprise receiving, by the one or more processors, a request for an underwater cable route connecting a first location and a second location; and generating, by the one or more processors, one or more potential underwater cable routes using the model based on the first location, the second location, and the bathymetry data.

The method may further comprise generating, by the one or more processors, a grid representing a surface of the Earth; assigning, by the one or more processors to each point on the grid, one or more predetermined efficiency values based on the received bathymetry data; wherein the model may be further configured to generate the one or more potential underwater cable routes by minimizing an overall efficiency score.

The method may further comprise determining, by the one or more processors using the model, distances for a plurality of potential paths connecting the first location and the second location, wherein generating the one or more potential underwater cable routes may be further based on the distances.

The method may further comprise generating, by the one or more processors, a grid representing a surface of the Earth; and providing, by the one or more processors, the one or more potential underwater cable routes for display on the grid.

The method may further comprise determining, by the one or more processors using the model, a distance for each of the one or more potential underwater cable routes; and providing, by the one or more processors, the distance for each of the one or more potential underwater cable routes for display.

The method may further comprise estimating, by the one or more processors using the model, a cost for the one or more potential underwater cable routes; and providing, by the one or more processors, the estimated cost of the one or more potential underwater cable routes for display.

The method may further comprise receiving, by the one or more processors, a selection of one of the one or more potential underwater cable routes, wherein the one or more potential underwater cable routes may be a plurality of underwater cable routes; optimizing, by the one or more processors, the model based on the selection.

The present disclosure further provides for a system comprising one or more processors. The one or more processors are configured to receive bathymetry data; receive existing route data for a plurality of existing underwater cable routes; generate, based on the bathymetry data and the existing route data, a model for determining potential underwater cable routes; receive a request for an underwater cable route connecting a first location and a second location; and generate one or more potential underwater cable routes using the model based on the first location, the second location, and the received bathymetry data. The system may further comprise a display configured to output the one or more potential underwater cable routes on a grid representing a surface of the Earth.

The present disclosure still further provides for receiving, by one or more processors, bathymetry data; receiving, by the one or more processors, existing route data for a plurality of existing underwater cable routes; and generating, by the one or more processors, based on the bathymetry data and the existing route data, a model for determining potential underwater cable routes; receiving, by the one or more processors, a request for an underwater cable route connecting a first location and a second location; and generating, by the one or more processors, one or more potential underwater cable routes using the model based on the first location, the second location, and the bathymetry data.

DETAILED DESCRIPTION

Overview

Figure 1:
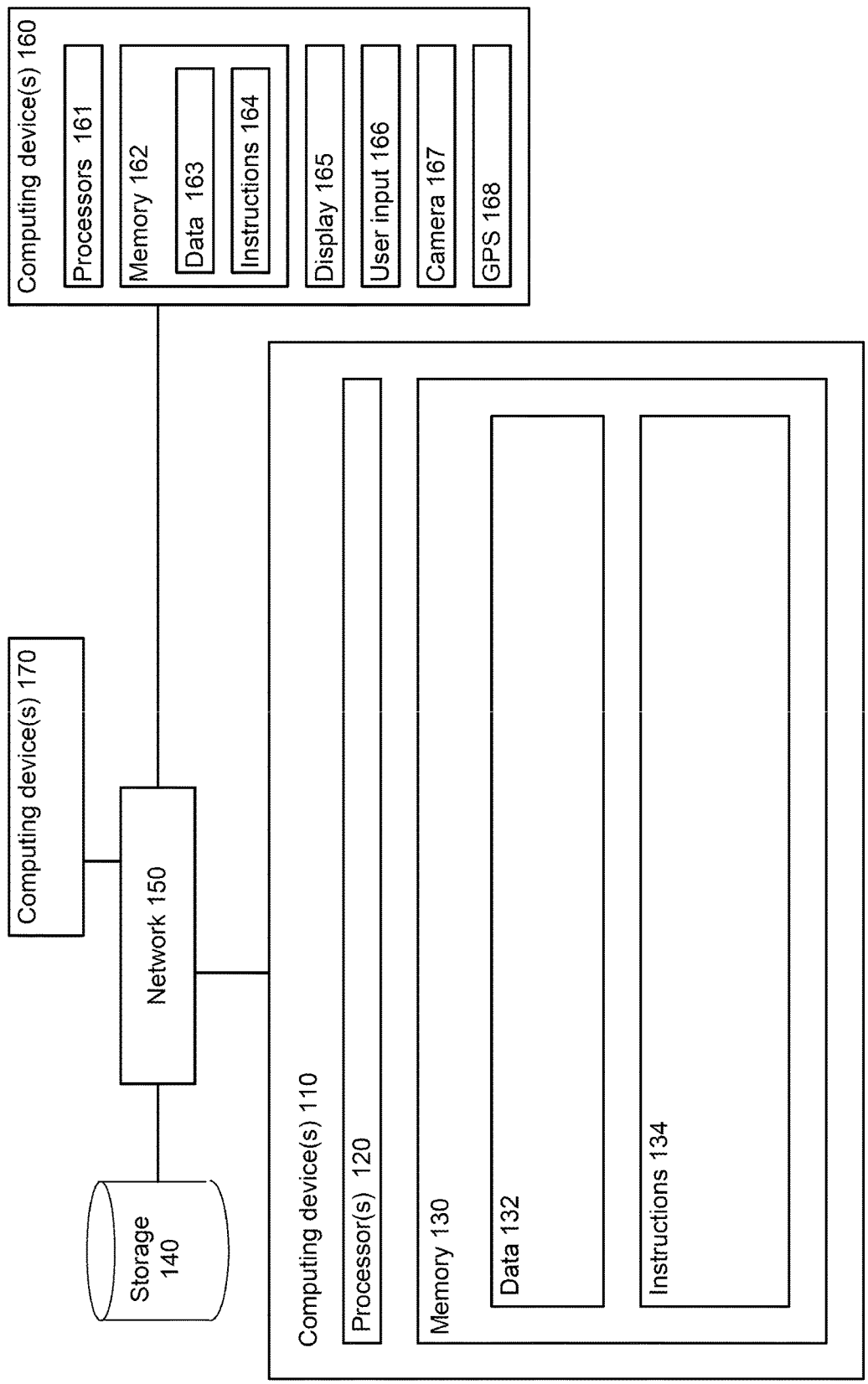
FIG. 1 is a block diagram showing an example system for planning underwater cable routes in accordance with aspects of the disclosure.

A system is provided for automatically generating potential underwater cable routes. In this regard, bathymetry data and existing underwater cable routes may be received, and a model may be generated based on the bathymetry data and the existing route data. Once the model is generated, when a request is received for an underwater cable route connecting a first location and a second location, the model may be used to generate one or more potential underwater cable routes based on the first location, the second location, and the bathymetry data.

The model may be generated using information on regions including the plurality of existing underwater cable routes as training input, and geographic coordinates of the plurality of existing underwater cable routes as training output. Such information on the regions may include the bathymetry data for the regions. Since the existing underwater cable routes are results of previous optimization, the model may be trained to recognize patterns in these optimizations. In some instances, the received bathymetry data and the received existing route data may be first mapped to a grid representing a surface of the Earth before being used as training input.

Further, the model may be generated by using efficiency parameters as training input features. Where a grid system is used to represent a surface of the Earth or underwater surface of the Earth, one or more predetermined efficiency values may be assigned to each grid element, such as each point and/or line, on the grid based on various efficiency parameters. For example, the efficiency parameters may include bathymetry, cable laying speed, cable type, cable outage rate, and cost information. Where multiple efficiency parameters are used, an aggregated efficiency parameter may be determined for each grid element by performing a sum or weighted sum of the efficiency values assigned for different efficiency parameters to each grid element. Further, an overall efficiency score for each existing underwater cable route may be determined by performing a sum or weighted sum of the aggregated efficiency values at each point along the route. Accordingly, using the existing underwater cable routes and the assigned predetermined efficiency values, the model may be trained to choose points on the grid that form more efficient potential underwater cable routes. For example, the model may be trained to minimize a loss function including one or more efficiency parameters, resulting in one or more potential underwater cable routes with lower overall efficiency scores. Additionally, the model may be further trained to choose points on the grid that minimize overall distance of potential underwater cable routes.

In some instances, certain efficiency parameters may be derived based on the bathymetry data. For example, a higher water depth may require a lower amount of time and/or resources needed for laying cable, and thus a higher predetermined efficiency value may be assigned to a point with higher water depth. Such dependency may be expressed by mathematical functions or by lookup tables with predetermined values. For example, cable laying speed and cable type may be derived based on the bathymetry values. In other instances, certain efficiency parameters may not be derived based on bathymetry data. For example, data on cable laying speed and cable type may alternatively be received rather than derived based on the bathymetry values. As described in examples below, cost information, cable outage rate, etc., may also be derived or received in other ways than based on bathymetry data.

Once trained, the model may be used to generate potential underwater cable routes. For instance, a request may be received for an underwater cable route connecting a first location and a second location. Based on the first location, the second location, and the bathymetry data, the model may generate one or more potential underwater cable routes. The model may further use efficiency parameters, such as cable laying seed, cable type, outage rate, cost information, etc., to generate the one or more potential underwater cable routes. For example, the model may minimize a loss function including the one or more efficiency parameters, such as by choosing points connecting the first location and second location to minimize overall efficiency score of the route. Additionally, the model may be further configured to generate potential underwater cable routes by minimizing an overall distance of the route.

Once generated, the one or more potential underwater cable routes may be provided as output. For example, the geographic coordinates of the one or more potential underwater cable routes may be provided as a file. As another example, the one or more potential underwater cable routes may be provided for display, such as mapped onto a grid representing the surface of the Earth. Additional information on the one or more potential underwater cable routes may be provided for display, such as overall distance, cost, cable types, time required for laying cable, territorial information, etc.

The model may be optimized by further training. For instance, a plurality of potential underwater cable routes may be generated by the model, and provided for display. A user, such as a person with knowledge of underwater cable route planning, may select one of the potential underwater cable routes. The user may make the selection based on information on the potential routes that are generated by the model, or based on personal knowledge or experience including factors not considered by the model. Information on a region including the selected route may then be used as training input, while the selected route may be used as training output. This way, the model may be trained to learn from such selections, which are results of human optimization.

The technology generates potential underwater cable routes that are optimized for efficient use of natural resources and for increased safety. By building a model that simultaneously considers a multitude of factors, route planning can be performed in less time, which reduces human effort. The model can be refined and refreshed based on human feedback and newly developed cable routes. Further, although the data used to build the model may be large in volume, the user can input simple information into the model, and is presented with information that is easy to understand.

Example Systems

FIG. 1 illustrates an example system used to generate underwater cable routes. It should not be considered as limiting the scope of the disclosure or usefulness of the features described herein. In this example, system 100 can include one or more computing devices 110 in communication with one or more computing devices 160, 170, as well as storage system 140, through a network 150. Each of the computing devices 110, 160, 170 may contain one or more processors, memory, and other components typically present in general purpose computing devices. For instance, memory 130 of the computing devices 110 can store information accessible by the one or more processors 120, including instructions 134 that can be executed by the one or more processors 120.

Memory 130 can also include data 132 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories. For instance, the data 132 may include bathymetry data, cable laying speed data, cable type data, best practice rules, ship traffic data, existing cable route data, cost information, parameters, thresholds, model for generating underwater cable routes, etc.

The instructions 134 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below. For instance, the instructions 134 may include how to process data, generate models, using models to generate underwater cable routes, generating displays, etc.

Data 132 may be retrieved, stored, or modified by the one or more processors 120 in accordance with the instructions 134. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, propriety codes, pointers, references to data stored in other memories such as at other network locations, or information that is used by a function to calculate the relevant data.

The one or more processors 120 can be any conventional processors, such as a commercially available CPU. Alternatively, the processors can be dedicated components such as an application specific integrated circuit ("ASIC") or other hardware-based processor. Although not necessary, the computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing devices 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Figure 2:
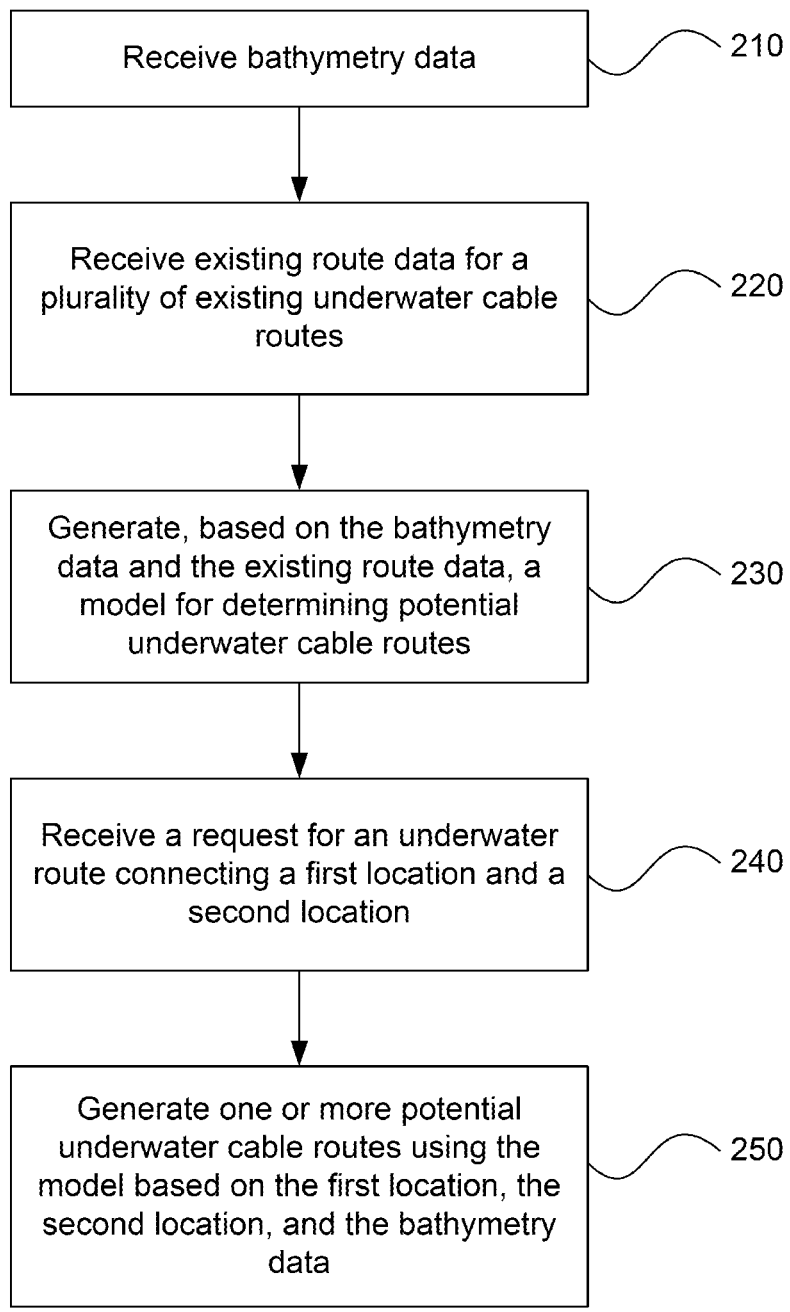
FIG. 2 is an example flow diagram for generating potential underwater cable routes in accordance with aspects of the disclosure.

Each of the computing devices 110, 160, 170 can be at different nodes of a network 150 and capable of directly and indirectly communicating with other nodes of network 150. Although only a few computing devices are depicted in FIG. 2, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

As an example, computing devices 110 may be server computing devices, while computing devices 160, 170 may be client computing devices. For instance, computing devices 110 may include web servers capable of communicating with storage system 140 as well as computing devices 160, 170 via the network 150. For example, computing devices 110 may be server computing devices that can use network 150 to transmit and present information to a user on a display, such as display 165 of computing device 160.

Each of the client computing devices 160, 170 may be configured similarly to the server computing devices 110, with one or more processors, memory and instructions as described above. Each of the client computing devices 160, 170 may be a personal computing device intended for use by a user, and have all of the components normally used in connection with a personal computing device. For example as shown, client computing device 160 includes processors 161 (e.g., a central processing unit CPU), memory 162 (e.g., RAM and internal hard drives) storing data 163 and instructions 164, a display such as display 165 (e.g., a monitor having a screen, a touch-screen, a projector, a television, or other device that is operable to display information), and user input device 166 (e.g., a mouse, keyboard, touch-screen, or microphone). The client computing device 160 may also include a camera 167 for recording video streams and/or capturing images, speakers, a network interface device, and all of the components used for connecting these elements to one another. The client computing device 160 may also include a location determination system, such as a GPS 168. Other examples of location determination systems may determine location based on wireless access signal strength, images of geographic objects such as landmarks, semantic indicators such as light or noise level, etc.

Although the client computing devices 160, 170 may each comprise a full-sized personal computing device, they may alternatively comprise mobile computing devices capable of wirelessly exchanging data with a server over a network such as the Internet. By way of example only, client computing device 160, 170 may be a mobile phone or a device such as a wireless-enabled PDA, a tablet PC, a netbook, a smart watch, a head-mounted computing system, or any other device that is capable of obtaining information via the Internet. As an example the user may input information using a small keyboard, a keypad, microphone, using visual signals with a camera, or a touch screen.

As with memory 130, storage system 140 can be of any type of computerized storage capable of storing information accessible by the server computing devices 110, such as a hard-drive, memory card, ROM, RAM, DVD, CD-ROM, write-capable, and read-only memories. In addition, storage system 140 may include a distributed storage system where data is stored on a plurality of different storage devices which may be physically located at the same or different geographic locations. As shown, storage system 140 may be connected to various computing devices via the network 150, and/or may be directly connected to any of the computing devices 110, 160, 170.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

FIG. 2 shows an example flow diagram 200 for generating potential underwater cable routes using a model. Flow diagram 200 may be performed by one or more processors, such as one or more processors 120 shown in FIG. 1. For example, processors 120 may receive data and make various determinations as shown in the flow diagram 200.

Referring to FIG. 2, at block 210, bathymetry data may be received. For instance, processors 120 of FIG. 1 may receive the bathymetry data from a database, from another computing device over a network, etc. The received bathymetry data may be stored in a memory, such as data 132 of memory 130 shown in FIG. 1. The bathymetry data received may include any data related to topography or hypsometry underwater. For example, the bathymetry data received may include water depth data. The bathymetry data received may be global and include data for any of a number of water bodies on Earth, such as lakes, rivers, oceans, etc. Alternatively, the bathymetry data may be regional and include data for only one or more particular regions of interest, such as a particular ocean, a region within certain territorial borders, etc.

At block 220, existing route data for a plurality of existing underwater cable routes may be received. For instance, the processors 120 may receive the existing route data from a database, from another computing device over a network, etc. The received existing route data may be stored in a memory, such as data 132 of memory 130 shown in FIG. 1. The existing route data received may include any data related to a plurality of existing underwater cable routes. For example, existing route data for an existing underwater cable route may include geographic coordinates of various points along the existing underwater cable route. Such geographic coordinates may be GPS coordinates, longitudes, latitudes, etc. For example, the geographic coordinates of cable routes may be provided as route position lists (RPLs). The existing route data may be either global and include data for any number of existing underwater cable routes around the world, or may be regional and limited to data for a particular region of interest.

In some instances, the received bathymetry data and the received existing route data may be prepared as training data before being used to train a model. To do so, the received existing route data may be correlated with the received bathymetry data. For instance, FIG. 3 is a simplified pictorial representation of correlating the received bathymetry data and the received existing route data on a grid system.

Figure 3:
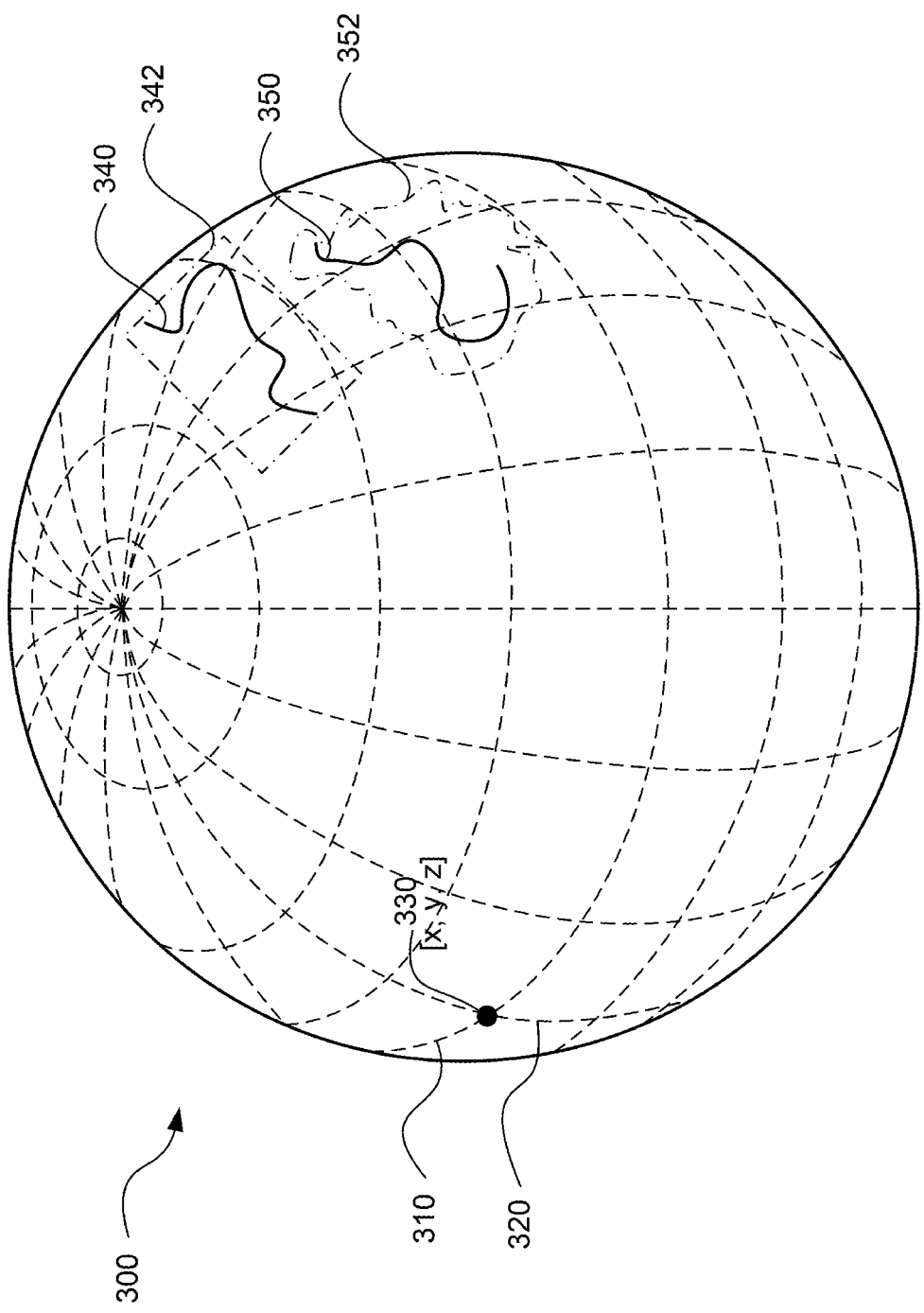
FIG. 3 is a pictorial diagram illustrating an example grid system in accordance with aspects of the disclosure.

As shown in FIG. 3, a grid 300 may be generated to represent the surface of the Earth and/or underwater surface of the Earth. For instance, the grid 300 includes latitude lines and longitude lines, such as latitude line 310 and longitude line 320. Further as shown, the latitude lines and longitude lines may intersect at various points, such as point 330 formed by the intersection between latitude line 310 and longitude lines 320. The intersection point 330 may correspond to coordinates [x, y] on the Earth's surface. Although only a few longitude lines, latitude lines, and intersection point are shown in grid 300 for ease of illustration, in practical situations the grid 300 may be finely grained and include a large number of longitude lines, latitude lines, and intersection points. For example, the grid may include lines that are within a meter apart, several meters apart, etc., as deemed appropriate in practical situations. Further, although the lines are shown as straight, in other instances lines in the grid may be curved, such as following boundaries of a water body.

The received bathymetry data may then be mapped onto the grid 300. As such, there may be a bathymetry value for each point on grid 300. For example as shown, the intersection point 330 may now include a set of values [x, y, z], where x and y are geographic coordinates on Earth's surface, and z is water depth. In cases where the received bathymetry data is more finely grained than the grid 300, the additional bathymetry values may be dropped. In cases where the received bathymetry data is less finely grained than the grid 300, extrapolation may be used to generate intermediate bathymetry values points on the grid 300.

Further as shown in FIG. 3, the received existing route data on the plurality of existing underwater cable routes may also be mapped onto the grid 300. For example, an existing underwater cable route 340 and an existing underwater cable route 350 are mapped onto the grid 300 based on the geographic coordinates of the Earth's surface. As such, each point along the existing underwater cable routes 340, 350 may include a set of values [x, y, z], where x and y are geographic coordinates on Earth's surface, and z is water depth. A given route may be approximated or represented by elements of the grid 300, such as by the points and/or lines. For example, a given route may be approximated according to a certain measurement parameter, such as least square error or other appropriate approximation. In cases where the received existing route data is more finely grained than the grid 300, the additional existing route data points may be dropped. In cases where the received existing route data is less finely grained than the grid 300, extrapolation may be used to generate intermediate points along the existing underwater cable routes.

Returning to FIG. 2, at block 230, based on the bathymetry data and the existing route data, a model may be generated for determining underwater cable routes. In this regard, the model may be generated by training a machine learning model using the received bathymetry data and the existing route data as training data. Since existing underwater cable routes are likely the results of previously performed optimizations, the machine learning model may be trained with these existing underwater cable routes to learn patterns that may result from optimizations. Further in this regard, the model may be any of a number types of model. As some examples, the model may be a regression model such as a linear regression model, a neural network model, a random forest model, a decision tree model, etc.

A supervised training method may be used to train the model. For instance, geographic coordinates and bathymetry data in regions including the plurality of existing underwater cable routes, may be used as the training input, while the geographic coordinates and the bathymetry data of the existing underwater cable routes may be used as the training output. The region may be selected in any of a number of ways. For example, the region 342 maybe selected with some arbitrary boundaries surrounding the existing underwater cable route 340. As another example, region 352 may be selected with boundaries corresponding to the water body that existing underwater cable route 350 is in. Thus, the model is trained to recognize patterns in the bathymetry data of the existing underwater cable routes that result in optimized routes. For example, the model may be trained to recognize that the existing underwater cable routes avoid areas with water depths shallower than a predetermined value. As mentioned above, the bathymetry data and the existing route data may be first mapped to a same system, such as grid 300, before being used as training data.

Further, the model may be trained to generate underwater cable routes further based on one or more efficiency parameters. For example, certain conditions, such as underwater depth, may correspond to a certain amount of time and/or a certain amount of resources needed for laying cable. These conditions may be used as efficiency parameters. For instance, one or more predetermined efficiency values may be assigned based on the corresponding bathymetry value to each point and/or line on the grid 300. For example, a higher predetermined efficiency value may be assigned to a point with a higher water depth, which requires a lower amount of time and/or resources needed for laying cable. Alternatively the relationship may be defined such that a lower predetermined efficiency value may be assigned to a point with a lower water depth. Thus, an existing underwater cable route may have an overall efficiency score based on the predetermined efficiency values assigned to each point along the existing underwater cable route. For example, the overall efficiency score may be a sum or weighted sum of predetermined efficiency values assigned to points along the existing underwater cable route. Accordingly, the model may be trained using the existing underwater cable routes to generate potential underwater cable routes that optimize the overall efficiency. In this regard, optimization may be minimizing or maximizing the overall efficiency score depending on how the efficiency values are assigned. For example, the model may be configured to generate potential underwater cable routes by minimizing a loss function with various efficiency parameters, such as by choosing points on the grid for which the sum or weighted sum of the predetermined efficiency values along the route result in a minimized overall efficiency score.

Figure 4:
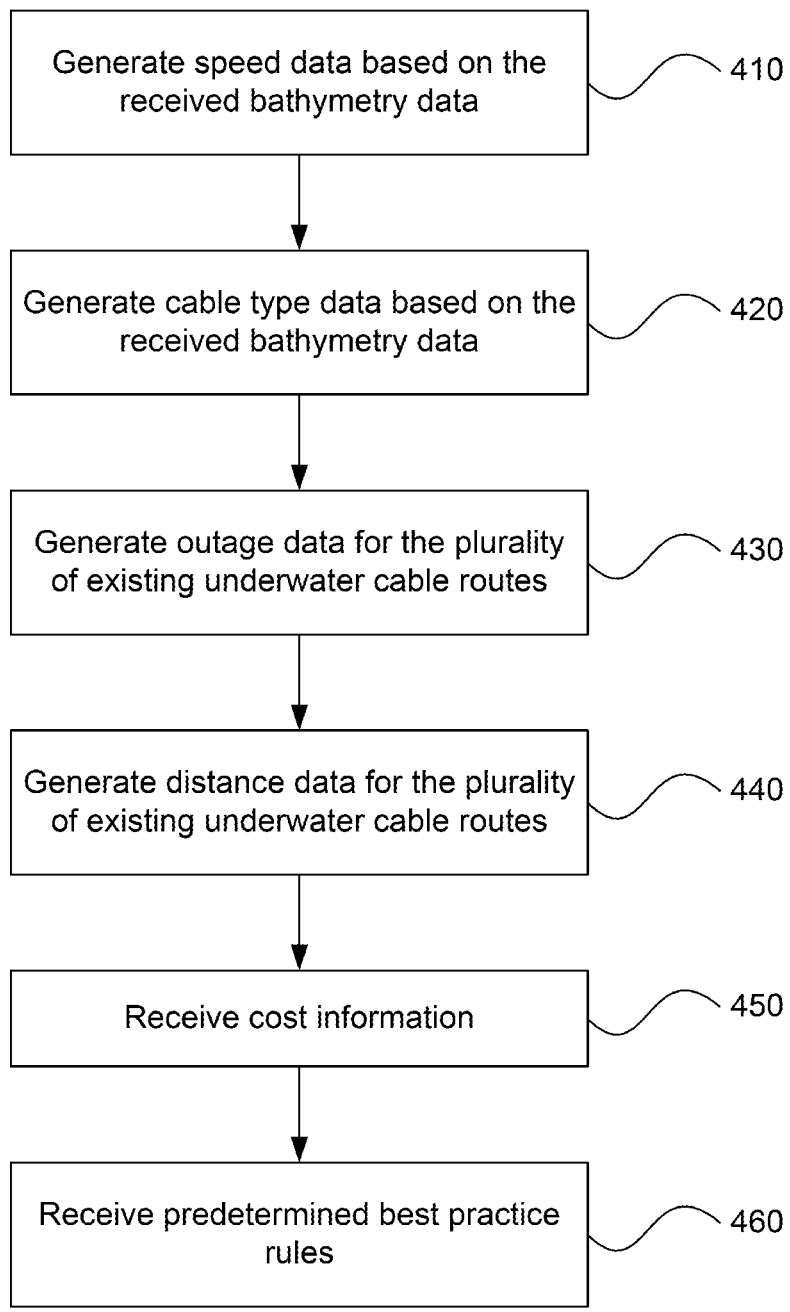
FIG. 4 is an example flow diagram for extracting features in accordance with aspects of the disclosure.

In this regard, FIG. 4 shows a flow diagram 400 illustrating how various features may be extracted for training the model to generate efficient underwater cable routes. For instance, each feature shown in in the flow diagram 400 may be used as an efficiency parameter in the model, in any combination. Flow diagram 400 may be performed by one or more processors, such as one or more processors 120 shown in FIG. 1. For example, processors 120 may receive data and make various determinations as shown in the flow diagram 400.

Referring to FIG. 4, at block 410, speed data for laying cables underwater may be generated based on the received bathymetry data. The speed data may be the speed that a vessel, such as a ship, can achieve when laying underwater cables. For example, cable laying speed may depend on the depth of the water, where the speed may be faster in deeper water than in shallower water. Further, cable laying speed may be known for certain predetermined depths of water. Thus, based on the known values and/or the known relationships, cable laying speed may be generated for each point along existing underwater cable routes, for each point in one or more regions of interest, or for each point and/or line on grid 300. For example, based on the known values and/or the known relationships, a lookup table may be generated with a speed value corresponding to each water depth or range of water depth. Then, to generate a speed value for a point on grid 300, processors 120 may access the lookup table, and find the speed value corresponding to the water depth or range of water depth at that node. Alternatively or additionally, mathematical functions, such as linear or non-linear functions, may be generated to represent correspondence between the speed values and the water depths.

The model may be trained to generate efficient underwater cable routes based on the speed data. For instance, a higher cable laying speed reduces the amount of time needed to lay cables along a route, which may in turn reduce resource use, such as fuel and human effort. Accordingly, a predetermined efficiency value may be assigned based on the corresponding speed data to each point along existing underwater cable routes, to each point in one or more regions of interest, or to each point and/or line on grid 300. For example, a higher predetermined efficiency value may be assigned to a point with a higher cable laying speed, which requires a lower amount of time and/or resources needed for laying cable. Thus, the overall efficiency score of an existing underwater cable route may be further based on the speed data at each point along the existing underwater cable route. As such, the model may be trained using the existing underwater cable routes to generate potential underwater cable routes that maximize the overall efficiency score by increasing the overall cable laying speed. For example, the model may be configured to generate potential underwater cable routes by minimizing a loss function that includes cable laying speed as a parameter.

At block 420, cable type data may be generated based on the received bathymetry data. The cable types may include a number of different properties, such as different materials, different transmission speeds, transmission modes, etc. For example, the appropriate type of cable may depend on the depth of the water, temperature of water, composition of the water, speed of the water current, etc. Further, required or recommended cable types may be known for certain predetermined depth ranges. Thus, based on the known values and/or the known relationships, cable type may be generated for each point along existing underwater cable routes, for each point in one or more regions of interest, or for each point and/or line on grid 300. For example, based on the known values and/or the known relationships, a lookup table may be generated with one or more required or recommended cable types corresponding to each water depth or range of water depth. Then, to determine a cable type for a point on grid 300, processors 120 may access the lookup table, and find the one or more cable types corresponding to the water depth or range of water depth at that node. Alternatively or additionally, mathematical functions, such as linear or non-linear functions, may be generated to represent correspondence between the speed values and the water depths.

The model may be trained to generate efficient underwater cable routes based on the cable type data. For instance, certain types of cables may be more efficient in terms of using smaller amount of materials, consuming less energy, being more environmentally friendly and/or less expensive than other types, etc. Accordingly, a predetermined efficiency value may be assigned based on the corresponding required cable type to each point along existing underwater cable routes, to each point in one or more regions of interest, or to each point and/or line on grid 300. For example, a higher predetermined efficiency value may be assigned to a point where a cable type that uses less materials, consumes less energy, is more environmentally friendly and/or less expensive, may be used. Thus, the overall efficiency score of an existing underwater cable route may be further based on the cable type data at each point along the existing underwater cable route. As such, the model may be trained using the existing underwater cable routes to generate potential underwater cable routes that maximize the overall efficiency score by favoring points where a more efficient cable type may be used. For example, the model may be configured to generate potential underwater cable routes by minimizing a loss function that includes cable type as a parameter.

At block 430, outage data may be generated for existing underwater cable routes. Outage may occur as a result of faults or damages in the underwater cables. Outage data may be generated based on ship traffic data. Ship traffic data may include satellite images, radar images, and other signals. As an example, Automatic Identification System (AIS) is an automatic tracking system used by vessel traffic services (VTS). In this regard, AIS equipment on a ship, such as transceivers or transponders, may broadcast information, such as a unique identification or signature of the ship, as well as its geographic position, course, speed, etc. As such, ships equipped with AIS transceivers may be tracked by AIS base stations located along coast lines or, when out of range of terrestrial networks, through satellites provided with special AIS receivers that are capable of distinguishing between a large number of ship signatures.

For instance, when an outage occurs along an existing underwater cable route, a ship may remain in the location of the outage for some extended period of time to repair the outage. Typical repairing times may be between 12 and 36 hours. As such, ship traffic data may be used to track location of ships over time. Based on the tracked location over time, it may be determined whether a ship remains at a point along an existing underwater cable route for a predetermined length of time, which indicates an outage at that point. For example, the predetermined length of time may be set based on average repair time, such as between 12 and 36 hours.

Additionally, one or more particular types of ships may be identified as repair ships. For example, a repair ship may be identified by the unique identification and/or signature in the AIS signals broadcasted by the ship. Thus, in some instances traffic data of only the ships identified as repair ships may be monitored, which may be more efficient than monitoring the traffic of all ships. Further, one or more locations may be identified as ports where repair ships are historically or likely docked. Thus, in some instances, traffic data of only ships from such locations may be monitored. Alternatively, traffic data of ships from such locations may be more highly monitored than other locations, such as tracked at more frequent time intervals.

Further, over time, outage rate at each point along existing underwater cable routes may be determined by tracking the number of repairs that had occurred at the point over a period of time. Thus, additionally, a heat map may be generated based on the outage rate for each point along the existing underwater cable routes.

The model may be trained to generate efficient underwater cable routes based on the outage data. For instance, locations with higher outrage rates may indicate that more natural and human resources will be needed to maintain the cable in that location, resulting in an inefficient use of resources. Accordingly, a predetermined efficiency value may be assigned to each point along the existing underwater cable routes. For example, a higher predetermined efficiency value may be assigned to a point where outage rate is lower. Thus, the overall efficiency score of an existing underwater cable route may be further based on the outage rate at each point along the existing underwater cable route. As such, the model may be trained using the existing underwater cable routes to generate potential underwater cable routes that maximize the overall efficiency score by favoring points with lower outage rates, or avoiding points with high outage rates. For example, the model may be configured to generate underwater cable routes by minimizing a loss function that includes outage rate as a parameter. Additionally or alternatively, for points with high outage rates, the model may provide additional information such as indicating where additional armoring, burial, bypass, or wet mesh in areas near such points.

At block 440, distance data may be generated for the existing underwater cable routes, and used to train the model. For example, overall distance for each of the existing underwater cable routes may be determined based on the bathymetry data and/or the geographic coordinates of points along the routes. Since shorter distance requires less natural and human resources, such as fuel, labor, cable materials, etc., the distance data may be used as training input so that the model may learn to favor paths with shorter distances.

For instance, predetermined efficiency values may be assigned based on overall distance, such as a higher predetermined efficiency value for a shorter overall distance. In this regard, the model may be trained using the existing underwater cable routes to generate potential underwater cable routes that maximize the overall efficiency score by favoring potential paths with shorter distances. For example, the model may be configured to generate potential underwater cable routes by minimizing a loss function that includes overall distance as an efficiency parameter.

As an alternative to generating the speed data, the cable type data, the outage data, the distance data in blocks 410, 420, 430, 440, in some instances some or all of these data may be received. For example, one or more of the speed data, cable type data, outage data, distance data may be received by processors 120 from a database, another computing device over a network, etc. In another example, the speed data and/or the cable type data may be received for the plurality of existing underwater cable routes, but may be generated for other points on the grid 300, such as by extrapolation.

Other information may also be received for training the model. Continuing from FIG. 4, at block 450, cost information may be received. For example, cost for different types of cables, fuel for ship, human labor, territorial permits, etc., may be received for existing underwater cable routes. As such, a predetermined efficiency value may be assigned to each point along the existing underwater cable routes, each point in regions of interest, or each point and/or line on grid 300. For example, a higher predetermined efficiency value may be assigned to a point where the cost is lower. Thus, the overall efficiency score of an existing underwater cable route may be further based on the cost information at each point along the existing underwater cable route. As such, the model may be trained using the existing underwater cable routes to generate potential underwater cable routes that maximize the overall efficiency score by favoring points with lower costs. For example, the model may be configured to generate underwater cable routes by minimizing a loss function that includes cost as a parameter.

At block 460, predetermined best practice rules for laying underwater cables may be received. Such predetermined best practice rules may be obtained from various organizations, which may set rules based on safety, environmental, efficiency, and other reasons. As an example rule, an international guideline may specify that underwater cables must be laid perpendicular to oil pipelines. Another example rule may specify how cable slacks in mountainous regions must be handled. Further, there may be best practice rules for the types of cables to be used based on depth of water. These best practice rules may be used as training input so that the model may learn to recognize patterns in the existing underwater cable routes that follow these rules. For example, instead of obtaining a map of all the oil pipelines in a region, the model may recognize that all existing underwater cables in that region are laid along a same direction. Based on the best practice rule that underwater cables must be laid perpendicular to oil pipelines, the model may deduce the existence and direction of oil pipelines in the region, and thus may continue to generate underwater cable routes along that direction without actual knowledge of the oil pipelines.

Still further, other types of data may be used to train the model. For example, fishing data may also be used to train the model. In this regard, ship traffic data, such as satellite images, radar images, AIS signals, and other signals, may be used to analyze fishing activities. For instance, fishing activities may have impacts on underwater cables. For example, fishing nets may get entangled with the cables and cause faults, which may result in outages. As such, fishing ship traffic may be tracked over time to determine levels of fishing activity. Predetermined efficiency values may be assigned to each point along the existing underwater cable routes, to each point in one or more regions of interest, or to each point and/or line on grid 300. For example, a higher predetermined efficiency value may be assigned to a point where fishing activity level is lower.

Additionally, different types of fishing ship and/or activity, such as different types of fishing vessel, equipment, and/or movement patterns may be associated with different risk levels of damaging underwater cables. In this regard, the model may be trained with traffic data of fishing ships near or at locations of the existing underwater cable routes, and cable outage rates near or at these locations, to recognize different levels of risks to underwater cable routes posed by different types of fishing ship and/or activities. Thus, predetermined efficiency value may be assigned to each point along the existing cable routes, to each point in one or more regions or interest, or to each point and/or line on grid 300 further based on type of fishing ship and/or activity.

The overall efficiency score of an existing underwater cable route may be further based on the fishing activity level, fishing ship type, and/or fishing activity type at each point along the existing underwater cable route. As such, the model may be trained using the existing underwater cable routes to generate potential underwater cable routes that maximize the overall efficiency score by favoring points with lower fishing activity levels and/or points where certain types of fishing ships or fishing activities with higher risks to underwater cable are less common. For example, the model may be configured to generate underwater cable routes by minimizing a loss function that includes fishing activity level, fishing ship type, and/or fishing activity type as a parameter.

In instances where multiple efficiency parameters, such as those described in FIGS. 3 and 4, are considered by the model for each grid element such as a point or a line, then for each grid element an aggregated efficiency value may be determined. For example, an aggregated efficiency value for a grid element may be a sum or weighted sum of a predetermined efficiency value assigned to that grid element based on cable laying speed, a predetermined efficiency value assigned to that grid element based on cable type, a predetermined efficiency value assigned to that grid element based on outage data, and/or a predetermined efficiency value assigned to that grid element based on cost, etc. Then, a sum or weighted sum of aggregated efficiency values of all grid elements along a route may be added up to obtain an overall efficiency score for the route. In this manner route optimization based on multiple efficiency parameters may be performed.

Once the model is generated, the model may be loaded on one or more computing devices for use. For instance, the model may be loaded on memory 130 and may be used by processors 120 to generate potential underwater cable routes. Alternatively or additionally, the model may be loaded onto memory 162 and used by processors 161 to generate potential underwater cable routes.

Returning to FIG. 2, at block 240, a request for an underwater cable route may be received. For instance, the request may be received by processors 120 from a user, or through a user device such as computing device 160. For example, the user may enter the request using user input device 166. In some instances, a prompt for request may be generated, such as on display 165. Alternatively or additionally, the request may be received by processors 161 from user input device 166.

Figure 5:
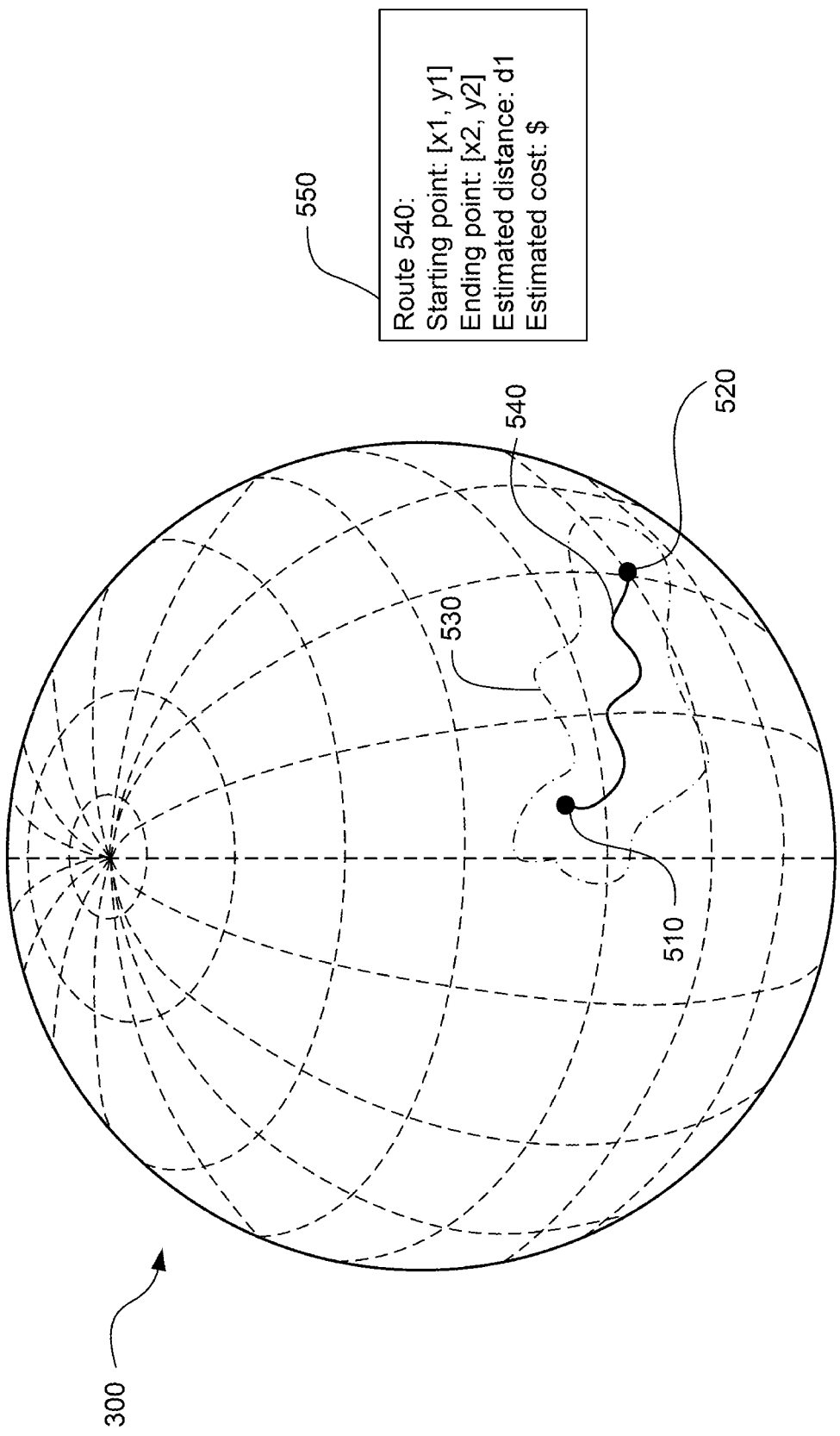
FIG. 5 is a pictorial diagram illustrating example input and output in accordance with aspects of the disclosure.

FIG. 5 is a pictorial diagram illustrating example input and output for the system. For example, grid 300 may be generated on display 165 for viewing, using which the user may select a region or locations to request an underwater cable route. The request may include a first location 510, such as a starting location for underwater cable, and a second location 520, such as an ending location for underwater cable. The locations may be provided as geographic coordinates, such as GPS, latitudes, longitudes, etc. Alternatively or additionally, the request may select a region in which underwater cable is to be laid, such as region 530 shown. A requested region may have arbitrary boundaries or may be boundaries of a water body, a territory such as within a country's border, etc. The request may additionally include other information. For example, the request may include additional requirements, such as a maximum overall distance, a maximum overall cost, a maximum time for completion, preferred cable types, preferred territories, etc.

Returning to FIG. 2, at block 250, one or more potential underwater cable routes may be generated using the model. In this regard, the processors 120 may provide information based on the request as input for the model. For instance, if not already included in the request, the processors 120 may select a region including the first location and the second location. The region may be selected with arbitrary boundaries surrounding the first location and the second location, or may be selected as the entire water body including the first location and the second location. The processors 120 may provide information on the selected region, such as geographic coordinates of the selected region and bathymetry data for the selected region, as input to the model. The processors 120 may further provide additional information in the request into the model.

The processors 120 may use additional data as input for the model. For example, speed data, cable type data, and/or outage data may be generated or received for the selected region, and used as input for the model. Further, any additional information received for the selected region, such as cost information, best practice rules, etc., may be used as input for the model. Additionally, predetermined efficiency values assigned to each point in the selected region based on the bathymetry data, speed data, cable type data, outage data, cost information etc., may be used as input for the model.

The processors 120 may receive one or more potential underwater cable routes as output from the model. For example, the model may output geographic coordinates of each point along the one or more potential underwater cable routes. For example, the geographic coordinates of the one or more potential underwater cable routes may be provided as RPLs. In this regard, the model may choose points within the selected region, based on the input provided, that would maximize an overall efficiency score. To do so, the model may consider one or more efficiency parameters, such as speed data, cable type data, outage data, cost information, at each point within the selected region. For example, the model may generate the potential routes by minimizing one or more loss functions including these efficiency parameters. The model may select these points further by favoring minimizing overall distance of the potential route. The model may be configured to generate a single potential underwater cable route or a plurality of potential underwater cable routes.

In addition to geographic coordinates of the one or more potential underwater cable routes, the processors 120 may receive additional output from the model. For example, the model may further be configured to generate an overall distance of the one or more potential underwater cable route as output. For instance, the model may calculate the overall distance based on the geographic coordinates and the bathymetry data along a potential underwater cable route. Additionally, the model may be configured to generate an overall cost of the one or more potential underwater cable routes as output, for example based on the speed data, cable type data, cost information, overall distance. The model may be configured to generate an estimated amount of time to lay cable for the one or more potential underwater cable routes as output, for example based on the speed data. Additional or alternative information may be generated as output by the model.

Once the one or more potential underwater cable routes are received from the model, processors 120 may generate further output. For example, the processors 120 may output a file including the geographic coordinates of the potential underwater cable routes, and/or other information, to a ship for laying cable. Additionally or alternatively, the processors 120 may generate a display of the one or more potential underwater cable routes. For example, the generated display may be provided on a user device, such as display 165 of computing device 160.

Referring again to FIG. 5, a display is generated showing an underwater cable route 540 generated by the model as mapped on the grid 300. Further as shown, additional information 550 may be displayed. For example as shown, the additional information may include geographic coordinates for the starting point and ending point, estimated distance, estimated cost. Although not shown, the additional information displayed may further include types of cable that will be needed for the potential route, estimated amount of time to lay the cable, territorial borders that the potential route will cross, possible oil pipelines and mountainous regions that the potential underwater cable route will cross, etc.

Figure 6:
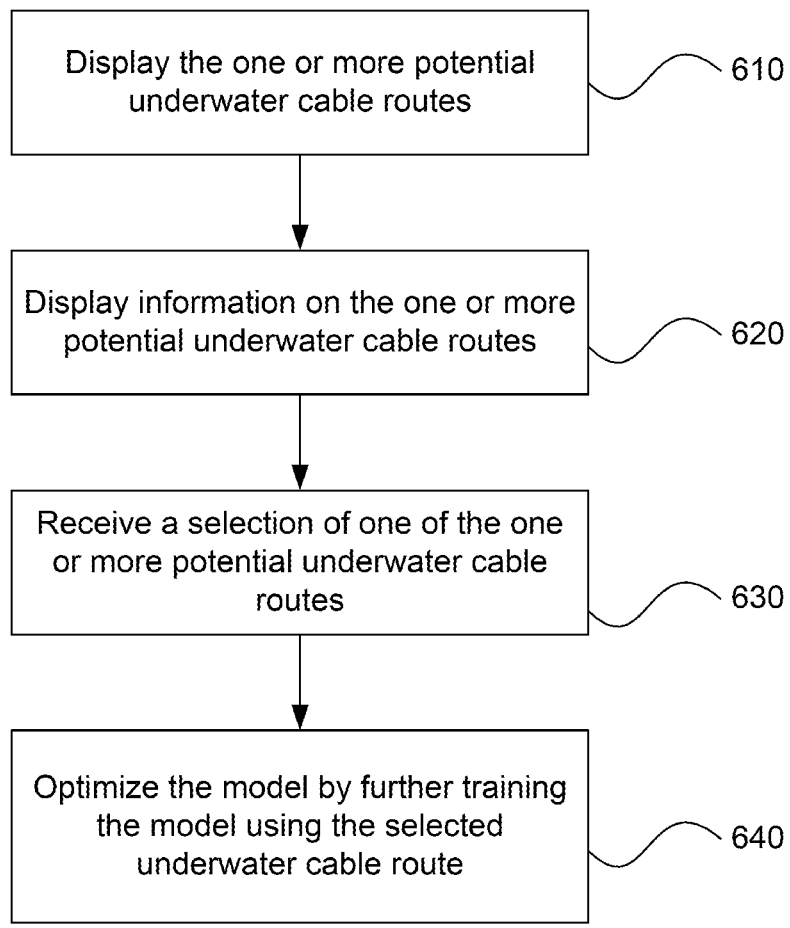
FIG. 6 is an example flow diagram for optimizing an underwater cable route planning model in accordance with aspects of the disclosure.

The model may be further trained based on a selection of the one or more potential underwater cable routes. FIG. 6 shows an example flow diagram 600 for further training the model. Flow diagram 600 may be performed by one or more processors, such as one or more processors 120 shown in FIG. 1. For example, processors 120 may receive data and make various determinations as shown in the flow diagram 600.

Referring to FIG. 6, at block 610, a plurality of underwater cable routes may be displayed. For example, the plurality of underwater cable routes may be displayed on a grid as shown in FIG. 5, or in some other format.

At block 620, information on the plurality of underwater cable routes may be displayed. For instance as mentioned above, such information may include the geographic coordinates of each potential underwater cable route, and/or additional information such as distance of each potential underwater route, cost of each potential underwater cable route, amount of time to lay cable for each potential underwater cable route, etc.

At block 630, a selection for one of the plurality of potential underwater cable routes may be received. For example, a user, such as a person with underwater cable laying experience or knowledge, may review the plurality of potential underwater cable routes generated by the model, and select a best option among them. For instance, the selection may be based on the information displayed to the user, or may be based on other information such as the user's knowledge. For example, the user may favor a route with faster cable laying speed over a route with more efficient cable type. As another example, the user may know that a particular territorial border has ongoing conflicts, and may choose the potential underwater cable routes avoiding that particular border.

At block 640, the model may be optimized by further training using the selected underwater cable route. For instance, features may be extracted from the selected underwater cable route and used as training input. Such features may include any of the examples described in relation to FIG. 4. Geographic coordinates of the selected underwater cable route may be used as training output. With more training, the model may learn to recognize patterns based on the selections of the user. The selection may improve the model in terms of optimizing based on the factors already considered by the model, and/or may improve the model in terms of factors that the model did not consider, but was considered by the user. For example, if most users favor routes with faster cable laying speed over routes with more efficient cable type, the model may change the weight used for these efficiency parameters. As another example, if all selections in a particular region avoids a particular territorial border, then the model may learn to select points to avoid crossing that particular border.

The technology generates underwater cable routes that are optimized for efficient use of natural resources and for increased safety. By building a model that simultaneously considers a multitude of factors, route planning can be performed in less time, which reduces human effort. The model can be refined and refreshed based on human feedback and newly developed cable routes. Further, although the data used to build the model may be large in volume, the user can input simple information into the model, and is presented with information that is easy to understand.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   receiving, by one or more processors, bathymetry data;
   receiving, by the one or more processors, existing route data for a plurality of existing underwater cable routes; and
   generating, based on the bathymetry data and the existing route data, a model for determining underwater cable routes, wherein the model is generated by using the bathymetry data and existing route data as training inputs.

2. The method of claim 1, further comprising:
   generating, by the one or more processors based on the received bathymetry data, additional data including at least one of speed data for laying cables along the plurality of existing underwater cable routes, cable type data along the plurality of existing underwater cable routes, or predetermined rules for laying underwater cable routes, wherein the model is generated further based on the additional data.

3. The method of claim 2, wherein the additional data includes predetermined rules, and wherein the predetermined rules include at least one of: rules for pipeline crossing, rules for handling cable slack in mountainous regions underwater, rules for cable type based on depth of water.

4. The method of claim 1, further comprising:
   generating, by the one or more processors based on ship traffic along the plurality of existing underwater cable routes, outage data for the plurality of existing underwater cable routes, wherein generating the model is further based on the outage data.

5. The method according to claim 4, further comprising:
   tracking, by the one or more processors, locations of ships over time along the plurality of existing underwater cable routes;
   determining, by the one or more processors based on the locations of the ships, that one or more ships remain at one or more particular locations along the plurality of existing underwater cable routes for a predetermined length of time; and
   determining, by the one or more processors based on the ships remaining at the particular locations for the predetermined length of time, that outages have occurred at the particular locations.

6. The method of claim 1, further comprising:
   receiving, by the one or more processors, cost information for the plurality of existing underwater cable routes, wherein the model is generated further based the cost information.

7. The method of claim 6, wherein the cost information includes at least one of: cable cost, ship cost, territorial cost.

8. The method of claim 1, further comprising:
   generating, by the one or more processors, a grid representing a surface of the Earth; and
   mapping, by the one or more processors, each of the received bathymetry data and received existing route data on the grid.

9. The method of claim 1, further comprising:
   receiving, by the one or more processors, a request for an underwater cable route connecting a first location and a second location; and
   generating, by the one or more processors, one or more potential underwater cable routes using the model based on the first location, the second location, and the bathymetry data.

10. The method of claim 9, further comprising:
    generating, by the one or more processors, a grid representing a surface of the Earth; and
    assigning, by the one or more processors to each point on the grid, one or more predetermined efficiency values based on the received bathymetry data;
    wherein the model is further configured to generate the one or more potential underwater cable routes by minimizing an overall efficiency score.

11. The method of claim 9, further comprising:
    determining, by the one or more processors using the model, distances for a plurality of potential paths connecting the first location and the second location, wherein generating the one or more potential underwater cable routes is further based on the distances.

12. The method of claim 9, further comprising:
generating, by the one or more processors, a grid representing a surface of the Earth; and
providing, by the one or more processors, the one or more potential underwater cable routes for display on the grid.

13. The method of claim 9, further comprising:
determining, by the one or more processors using the model, a distance for each of the one or more potential underwater cable routes; and
providing, by the one or more processors, the distance for each of the one or more potential underwater cable routes for display.

14. The method of claim 9, further comprising:
estimating, by the one or more processors using the model, a cost for the one or more potential underwater cable routes; and
providing, by the one or more processors, the estimated cost of the one or more potential underwater cable routes for display.

15. The method of claim 9, wherein the one or more potential underwater cable routes is a plurality of underwater cable routes, and wherein the method further comprises:
receiving, by the one or more processors, a user input indicating a selected underwater cable route selected from the one or more potential underwater cable routes;
extracting, by the one or more processors, one or more features of the selected underwater cable route; and
updating, by the one or more processors, the model using the extracted one or more features of the selected underwater cable route as an additional training input.

16. The method of claim 1, wherein the model is one of a regression model, a neural network model, a random forest model, or a decision tree model.

17. A system, comprising:
one or more processors, the one or more processors configured to:
receive bathymetry data;
receive existing route data for a plurality of existing underwater cable routes;
generate a model for determining potential underwater cable routes;
train the model using the bathymetry data and existing route data as a training input;
receive a request for an underwater cable route connecting a first location and a second location; and
generate one or more potential underwater cable routes using the trained model based on the first location, the second location, and the received bathymetry data.

18. The system of claim 17, further comprising:
a display configured to output the one or more potential underwater cable routes on a grid representing a surface of the Earth.

19. The system of claim 17, wherein the one or more potential underwater cable routes is a plurality of underwater cable routes, and wherein the one or more processors are configured to:
receive a user input indicating a selected underwater cable route selected from the one or more potential underwater cable routes;
extract one or more features of the selected underwater cable route; and
update the model using the extracted one or more features of the selected underwater cable route as a second training input.

20. A method, comprising:
receiving, by one or more processors, bathymetry data;
receiving, by the one or more processors, existing route data for a plurality of existing underwater cable routes; and
generating, by the one or more processors, a model for determining potential underwater cable routes;
training, by the one or more processors, the model using the bathymetry data and existing route data as a training input;
receiving, by the one or more processors, a request for an underwater cable route connecting a first location and a second location; and
generating, by the one or more processors, one or more potential underwater cable routes using the model based on the first location, the second location, and the bathymetry data.

* * * * *